(12) United States Patent
Chase et al.

(10) Patent No.: US 11,187,276 B2
(45) Date of Patent: *Nov. 30, 2021

(54) FLEXIBLE COUPLING

(71) Applicant: Crompton Technology Group Limited, Solihull (GB)

(72) Inventors: Ian Chase, Banbury (GB); Kevin Hadley, Much Wenlock (GB); Matthew Caton, Wolverhampton (GB)

(73) Assignee: CROMPTON TECHNOLOGY GROUP LIMITED, Banbury (GB)

( * ) Notice: Subject to any disclaimer, the term of this patent is extended or adjusted under 35 U.S.C. 154(b) by 463 days.

This patent is subject to a terminal disclaimer.

(21) Appl. No.: 16/119,183

(22) Filed: Aug. 31, 2018

(65) Prior Publication Data

US 2018/0372161 A1 Dec. 27, 2018

Related U.S. Application Data

(63) Continuation of application No. 15/111,526, filed as application No. PCT/GB2014/050098 on Jan. 14, 2014, now Pat. No. 10,415,648.

(51) Int. Cl.
*F16D 3/78* (2006.01)
(52) U.S. Cl.
CPC ..................... *F16D 3/78* (2013.01)
(58) Field of Classification Search
CPC ........................................... F16D 3/78
USPC ..................................... 464/93–96
See application file for complete search history.

(56) References Cited

U.S. PATENT DOCUMENTS

| 1,362,633 | A | | 12/1920 | McCutcheon |
| 1,480,096 | A | | 1/1924 | Moore |
| 3,108,457 | A | | 10/1963 | Weasler |
| 3,684,999 | A | | 8/1972 | Laframboise |
| 5,627,610 | A | * | 5/1997 | Marui ............... G02C 1/02 411/427 |
| 5,964,662 | A | | 10/1999 | Horak |
| 6,200,223 | B1 | | 3/2001 | Martens |
| 2009/0249917 | A1 | | 10/2009 | Gerke |
| 2016/0061273 | A1 | | 3/2016 | Chase et al. |

(Continued)

FOREIGN PATENT DOCUMENTS

| DE | 29623369 U1 | 4/1998 |
| DE | 102011109887 A1 | 2/2013 |
| FR | 2904070 | 1/2008 |

(Continued)

OTHER PUBLICATIONS

GB Search Report for Application No. GB1211494.8, dated Sep. 27; 3 pages.

(Continued)

*Primary Examiner* — Greg Binda
(74) *Attorney, Agent, or Firm* — Cantor Colburn LLP

(57) ABSTRACT

A flexible coupling comprises a flexible torque disc (24) having a first plurality of fixing points (24a) whereby it can be mounted upon a first rotatable component (12), in use, and a second plurality of fixing points (24b) whereby it can be mounted upon a second rotatable component (14), in use, a support ring (26), and mounting means (34) whereby the flexible torque disc (24) is secured to the support ring (26), the mounting means (34) restricting deflection of the flexible torque disc (24) relative to the support ring (26).

8 Claims, 5 Drawing Sheets

(56) References Cited

U.S. PATENT DOCUMENTS

2016/0356319 A1    12/2016   Chase et al.

FOREIGN PATENT DOCUMENTS

| | | |
|---|---|---|
| FR | 2904070 A1 | 1/2008 |
| GB | 842126 A | 7/1960 |
| GB | 2164122 A | 3/1986 |
| JP | S5031344 U | 4/1975 |
| JP | S52147843 U | 11/1977 |
| JP | S582424 U | 1/1983 |
| JP | 60201119 | 11/1985 |
| JP | S6124826 A | 2/1986 |
| JP | H07317795 A | 12/1995 |
| JP | H0893782 A | 4/1996 |
| JP | 2002081417 A | 3/2002 |
| JP | 2006189095 A | 7/2006 |
| JP | 2009097666 | 5/2009 |
| JP | 2010250461 A | 11/2010 |

OTHER PUBLICATIONS

Japanese Office Action for Japanese Patent Application No. JPA 2016-546916 dated Jun. 27, 2017, 7 pages.
Notification of Transmittal of the International Search Report of the International Searching Authority, or the Declaration; PCT/GB2014/050098; dated Sep. 18, 2014; 3 Pages.

\* cited by examiner

FLEXIBLE COUPLING

CROSS REFERENCE TO RELATED APPLICATIONS

The present application is a continuation application of U.S. patent application Ser. No. 15/111,526, filed on Jul. 14, 2016, now U.S. Pat. No. 10,415,648, which is a US National Stage of Application No. PCT/GB2014/050098, filed on Jan. 14, 2014, the disclosures of which are hereby incorporated herein by reference.

BACKGROUND

This invention relates to a flexible coupling, and in particular to a flexible coupling for use in the transmission of torque between a pair of rotatable components such as drive shafts, wherein the flexibility of the flexible coupling accommodates limited angular misalignment between the axes of rotation of the rotatable components.

One application in which a flexible coupling is used is in interconnecting the drive shafts used in the transmission of drive to the actuators associated with aircraft flight control surfaces such as wing mounted slats and flaps.

One type of flexible coupling that is well known comprises a series of mounting fingers formed on one of the rotatable components, the fingers each defining a fixing point to which a torque transmission disc is secured. By way of example, three such fingers and fixing points may be provided. The disc is conveniently secured to the fingers using bolts or other fasteners which extend through the openings formed in the fingers, the bolts or other fasteners being secured to respective parts of the torque transmission disc. The other of the rotatable component is similarly provided with a series of mounting fingers defining a series of fixing points to which the torque transmission disc is mounted. The parts of the disc secured to the fixing points of one of the components alternate with those by which the disc is secured to the other of the components.

In use, rotation of one of the rotatable components is transmitted to the torque transmission disc, and from the torque transmission disc to the other of the rotatable components. Any slight angular misalignment of the axes of rotation of the rotatable components can be accommodated by limited flexing of the torque transmission disc.

A number of different materials and designs of torque transmission disc are known. It is desirable to use composite materials for this purpose as they may be of reduced weight compared to other materials whilst being able to transmit the required level of torque.

One disadvantage of composite material torque transmission discs is that if the disc is subject to a relatively large out of plane flexing load, such as may occur during handling or during installation, or, for example, where installed between a pair of elongate drive shafts and work is being undertaken at the other end of one of the shafts requiring movement of that shaft, the degree of flexing which may take place may result in delamination, or partial delamination, of the torque transmission disc. Such delamination or partial delamination may result in the torque transmission disc being weakened. There is a fear that such weakening may not be noticed prior to installation, or during servicing, and that an installed torque transmission disc may fail, in subsequent use. The weakening may be such that the failure may occur some time after installation. The risk of the presence of such a latent fault may, depending upon the application in which the coupling is used, be unacceptable.

U.S. Pat. No. 6,200,223 illustrates a coupling of the general type described hereinbefore and in which the means by which the torque transmission disc is secured in position are such that drive may continue to be transmitted even in the event of a failure of the torque transmission disc.

It is an object of the invention to provide a flexible torque coupling in which the risk of damage to parts of the coupling is reduced.

SUMMARY

According to the present invention there is provided a flexible coupling comprising a flexible torque disc having a first plurality of fixing points whereby it can be mounted upon a first rotatable component, in use, and a second plurality of fixing points whereby it can be mounted upon a second rotatable component, in use, a support ring, and mounting means whereby the flexible torque disc is secured to the support ring, the mounting means restricting deflection of the flexible torque disc relative to the support ring.

The mounting means conveniently further serves to secure the first fixing points of the flexible torque disc to the first rotatable component. The second fixing points of the flexible torque disc, and support ring, are preferably secured, for example by means of bolts, to the second rotatable component at locations remote from the mounting means.

Such an arrangement is advantageous in that the support ring and mounting means serve to limit deflection or flexing of the flexible torque disc, thereby avoiding excessive flexing which could cause damage to the flexible torque disc.

In one embodiment, the flexible torque disc includes three equiangularly spaced first fixing points and three equiangularly spaced second fixing points, the second fixing points each being located midway between a respective pair of the first fixing points.

The mounting means may each comprise a bush attached to a respective first fixing point of the flexible torque disc, the bush extending through an opening provided in the support ring, the bush defining a stop engageable with the support ring to limit movement of the part of the flexible torque disc adjacent the mounting means away from the support ring.

The mounting means and flexible torque disc are conveniently bolted to the first rotatable component.

In use, as with a conventional flexible coupling, flexing of the torque disc can accommodate limited angular misalignment between the axes of rotation of the first and second rotatable components.

The bush may be of one piece form, arranged to be fitted through an opening of non-circular shape formed in the support ring, and moved angularly relative to the support ring to prevent withdrawal of the bush from the opening.

Alternatively, the bush may be of two part form, holding the support ring captive therebetween, in use.

The bush is conveniently designed to hold a nut captive thereto. By way of example, it may include a diametrically extending passage into which the nut can be fitted.

BRIEF DESCRIPTION OF THE DRAWINGS

The invention will further be described, by way of example, with reference to the accompanying drawings, in which.

DETAILED DESCRIPTION

Figure 1:
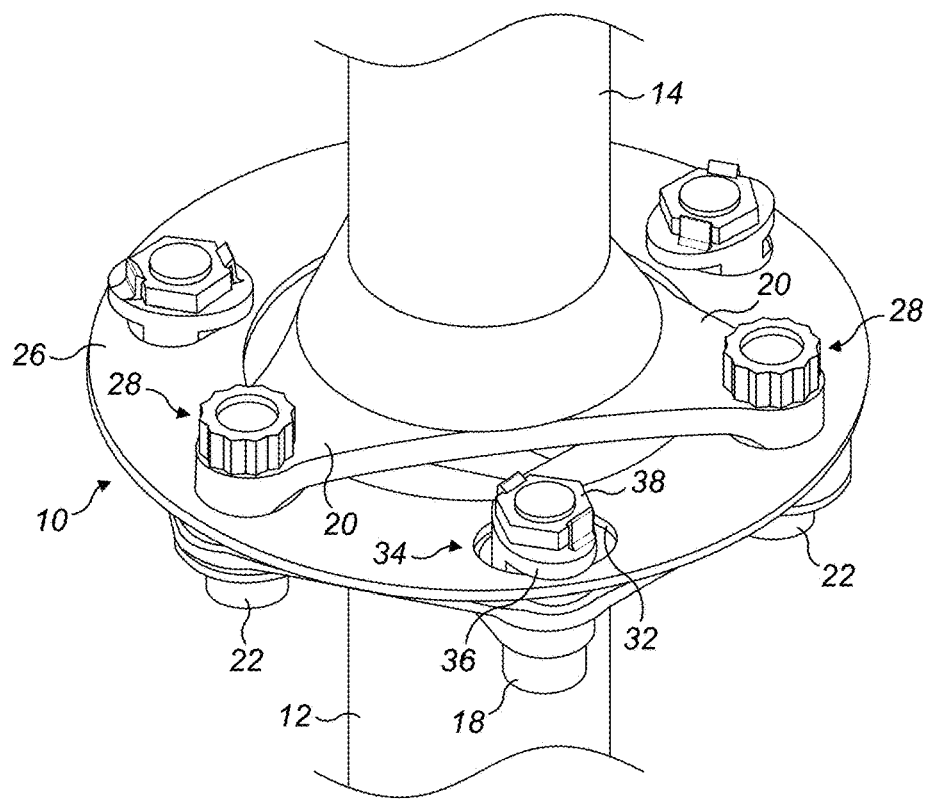
FIGS. 1 and 2 are perspective views, from above and from below, respectively, of a flexible coupling in accordance with one embodiment of the invention.
Figure 2:
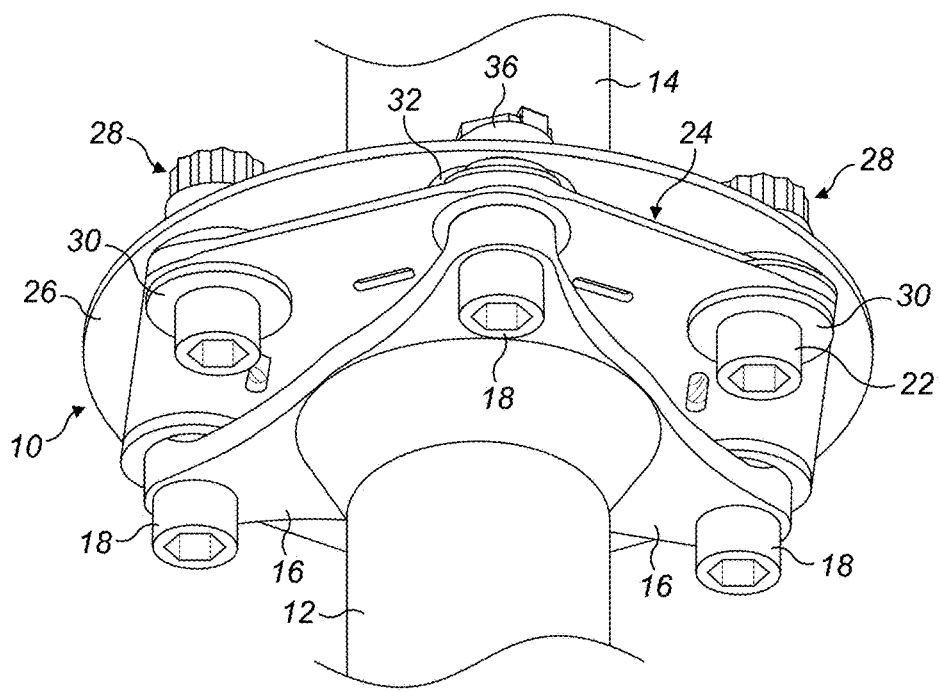

Referring firstly to FIGS. 1 and 2, a flexible coupling 10 is illustrated whereby torque can be transmitted between a first shaft 12 and a second shaft 14. The first and second shafts 12, 14 are approximately aligned with one another, but need not be exactly aligned. Rather, the axis of the first shaft 12 may be slightly angularly displaced relative to that of the second shaft 14. The first shaft 12 includes, at its end, three equiangularly spaced mounting fingers 16, each of which is provided with an opening receiving a bolt 18.

The second shaft 14, like the first shaft 12, is also provided with three equiangularly spaced mounting fingers 20. Each finger 20 is formed with an opening through which a respective bolt 22 extends.

Located between the fingers 16, 20 of the first and second shafts 12, 14 is a torque transmission disc 24. The disc 24 is of composite material form. By way of example, it may comprise layers of a carbon fibre material which have been impregnated with a suitable resin. The disc 24 is formed with six equiangularly spaced openings, alternate ones of the openings 24a of the disc 24 aligning with the openings of the fingers 16 and defining a first series of fixing points, the remaining alternate ones of the openings 24b of the disc 24 aligning with the openings of the fingers 20 and defining a second series of fixing points. The bolts 18, 22 extend through the respective ones of the openings 24a, 24b.

An annular support ring 26 is sandwiched between the disc 24 and the second shaft 14. The annular support ring 26 is formed with openings which align with the bolts 22, and through which the bolts 22 extend. Nuts 28 cooperate with the respective bolts 22 to securely attach the second fixing points of the disc 24, and the support ring 26, to the fingers 20 of the second shaft 14.

Figure 6:
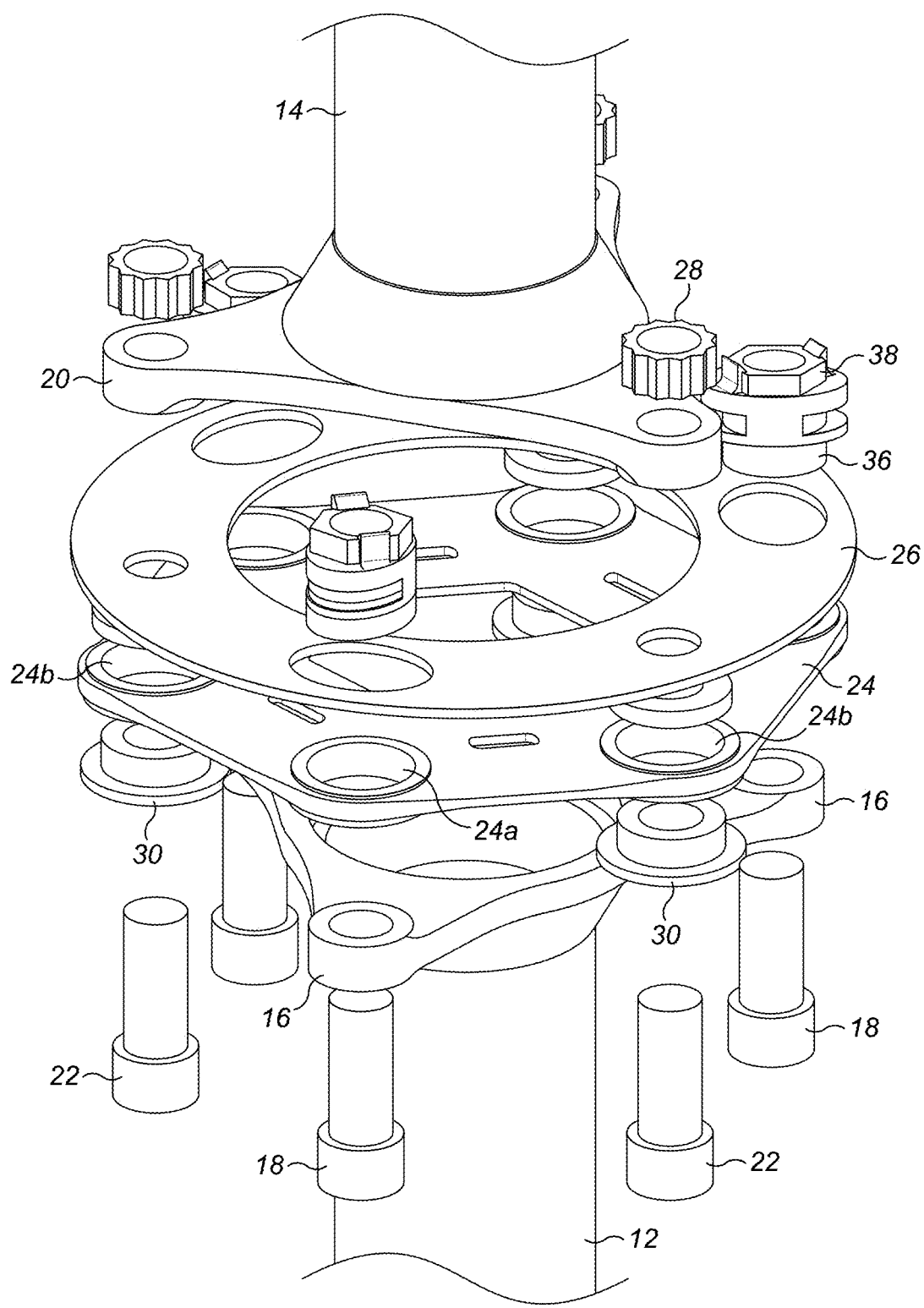
FIG. 6 is an exploded perspective view of the coupling of FIGS. 1 and 2.

As shown in FIG. 6, bushings 30 are conveniently press fitted into the openings 24b formed in the disc 24 to assist in the transmission of torque to or from the disc 24, spreading the load over a relatively large area and reducing the risk of contact between the bolts 22 and the disc 24 causing wear and damage to the disc 24.

It will be appreciated that the support ring 26 is rigidly mounted upon the fingers 20 of the second shaft 14 and substantially no movement occurs therebetween, in use.

The bolts 18 extend through the holes formed in the respective fingers 16, through associated holes or openings 24a formed in the disc 24, and through associated holes 32 formed in the support ring 26.

Figure 3:
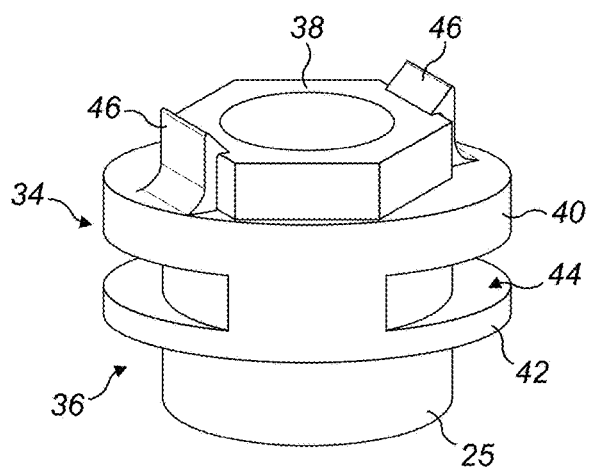
FIGS. 3 and 4 illustrate part of the coupling of FIGS. 1 and 2.
Figure 4:
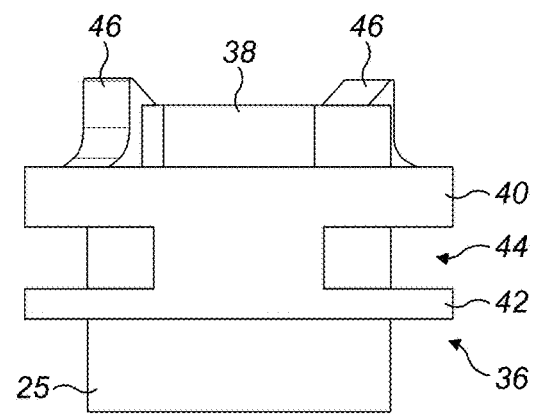

Mounting means 34 in the form of bushes 36 are each press fitted into respective ones of the openings 24a formed in the disc 24. Each bolt 18 extends through a respective one of the bushes 36, and the bushes 36 are secured in position by means of nuts 38 held captive to the respective bush 36. As shown in FIGS. 3 and 4, each bush 36 includes a pair of outwardly extending stop flanges 40, 42, defining a space 44 therebetween. The flanges 40, 42 are not of circular form, but rather are generally elliptical in shape. Likewise, the openings or holes 32 formed in the support ring 26 are generally elliptical.

During assembly, each bush 36 is orientated such that the flange 40 thereof can pass through the respective opening 32 formed in the support ring 26. After insertion, the bush 36 is moved about its axis through an angle of about 90.degree. with the result that the bush 36 cannot be withdrawn through the opening 32, but rather the bush 36 and support ring 26 are held captive to one another, the support ring 26 being trapped between the flanges 40, 42. The space 44 between the flanges 40, 42 is greater than the thickness of the support ring 26 with the result that limited axial movement of the bush 36 relative to the support ring 26 is permitted.

Figure 5:
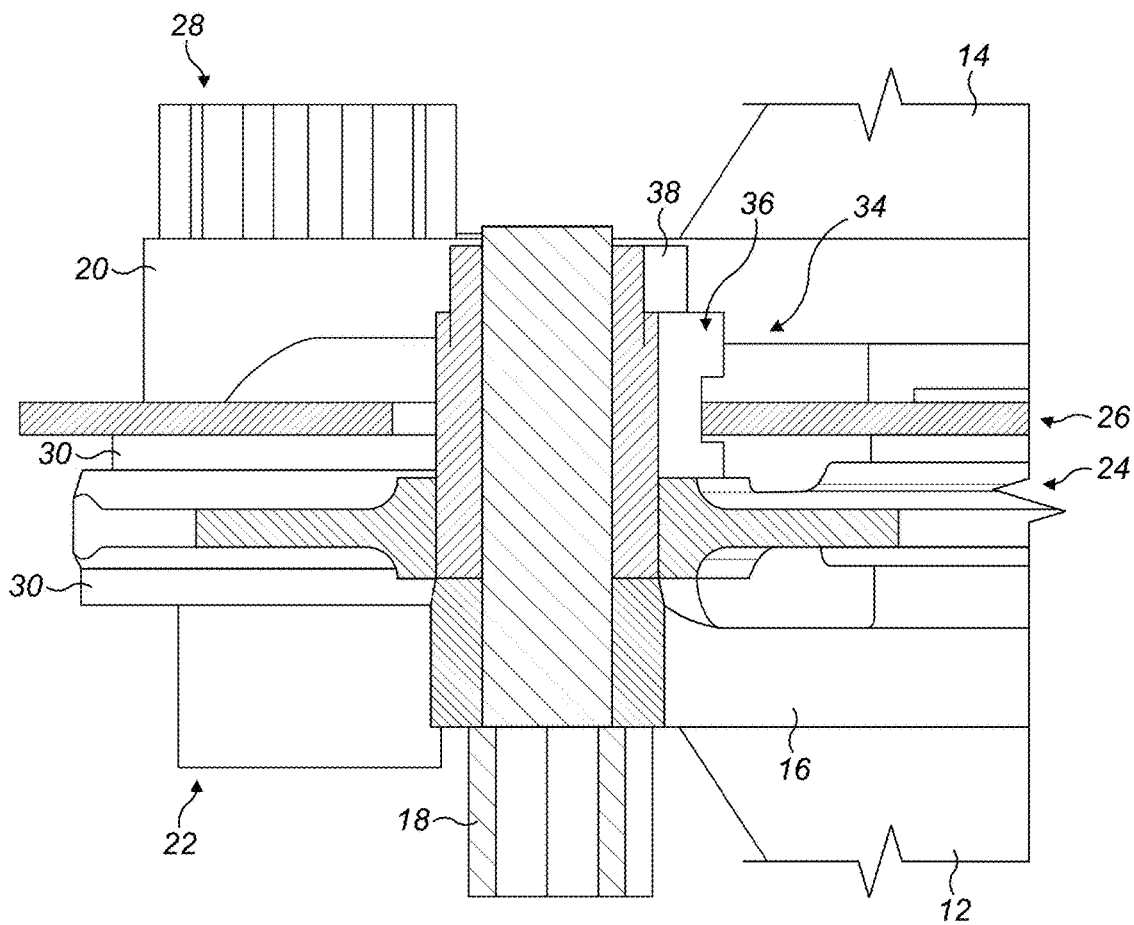
FIG. 5 is a sectional view illustrating part of the coupling of FIGS. 1 and 2.

The operation of mounting each bush 36 to the support ring 26 may be undertaken either before or after press-fitting of the bushes 36 to the disc 24. Where the press-fitting operation is undertaken after the mounting of a bush 36 to the support ring 26, the part of the bush 36 which is press-fitted to the disc 24, and the opening in the disc 24, may be of non-circular shape so as to resist subsequent rotation or angular movement of the bush 36. As shown in FIG. 5, the nuts 38 and bolts 18 serve to clamp the fingers 16, disc 24 and bushes 36 to one another.

In use, it will be appreciated that rotation of one of the shafts 12, 14 is transmitted to the other of the shafts 12, 14 via the disc 24. Flexing of the disc 24 accommodates slight angular misalignments between the axes of the shafts 12, 14. The amount of flexing of the disc 24 is restricted by the bushings 36 and the support ring 26. If a load is applied in a direction urging part of the disc 24 away from the support ring 26, flexing of that part of the disc 24 is permitted until such time as the flexing results in the flange 40 moving into engagement with the support ring 26. Once such engagement has been established, the cooperation between the bush 36 and the support ring 26 prevents further movement of the bush 36. As the bush is clamped to the disc 24, it will be appreciated that further flexing of the disc 24 is thus resisted. The risk of damage to the disc due to over flexing thereof is thus reduced.

Similarly, if a flexing load is applied in the opposite direction, urging the disc 24 towards the support ring 26, engagement between the flange 42 and the support ring 26 limits this movement and so prevents over-flexing of the disc 24.

Whilst the description hereinbefore is of the disc 24 and support ring 26 fitted to the shafts 12, 14, the fit of the bush 36 to the disc 24 is such that the support ring 26 provides support for the disc 24, preventing or resisting over flexing thereof both prior to installation and during the installation process, as well as when servicing or maintenance operations are being undertaken.

Where the flexible coupling is used in the transmission of drive to wing mounted components such as the actuators used to drive flight control surfaces for movement, in addition to accommodating slight misalignments as mentioned above, the coupling can also accommodate relative angular movement between the shafts such as may arise in the event of flexing of the wing, whilst continuing to guard against damage due to over flexing of the disc 24 in the event that the wing flexing were to become extreme.

Conveniently, as illustrated, the support ring 26 is of larger diameter than the disc 24. As a result, the likelihood of the edge of the disc 24 being impacted during storage, handling, installation and servicing is reduced. Again, this reduces the risk of failure of the disc 24.

Figure 7:
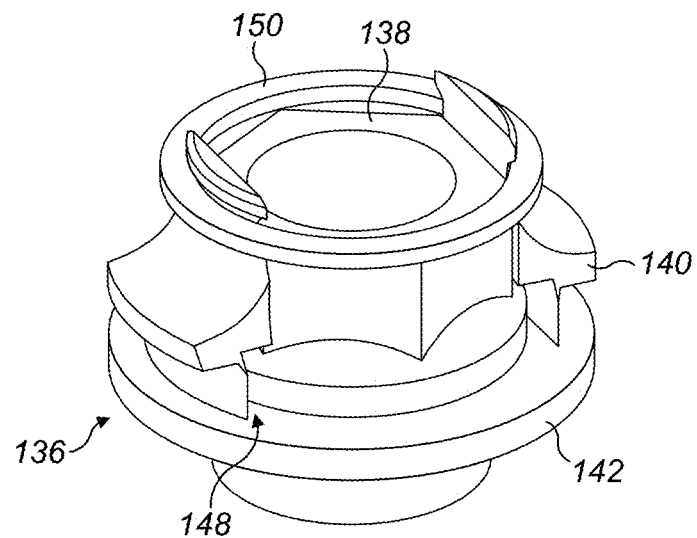
FIG. 7 illustrates part of an alternative embodiment.

In the arrangement described hereinbefore, the nut 38 is held captive to the bush 36, this being achieved by the provision of a pair of tangs 46 formed integrally with the bush 36. FIG. 7 illustrates an alternative design of bush 136. The bush 136 of FIG. 7 is shaped to define a diametrically extending passage or slot 148 within which the nut 138 is located, a retaining clip 150 being provided to securely clamp the nut 138 in position and reduce the risk of release thereof. In this design, only the flange 40 is of non-circular shape. Assembly is substantially as outlined hereinbefore.

Figure 8:
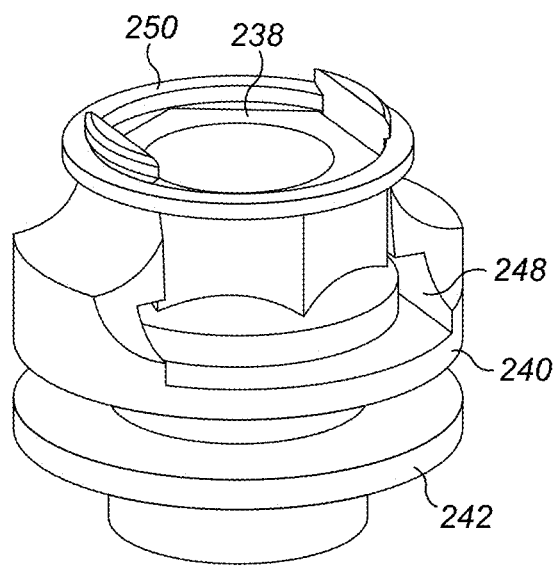
FIG. 8 is a view similar to FIG. 7 illustrating another alternative embodiment.
Figure 9:
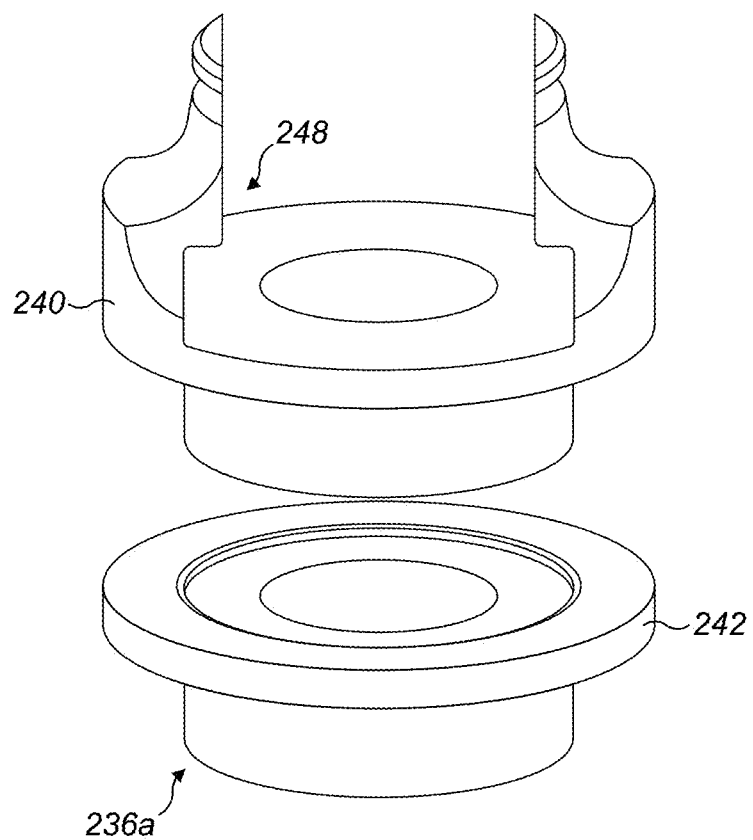
FIG. 9 illustrates part of the further alternative embodiment shown in FIG. 8.

FIGS. 8 and 9 illustrate a further alternative design of bush 236. The bush 236 of FIGS. 8 and 9 is of two part form, including a lower part 236a including the flange 242, and a separate upper part 236b including the flange 240, and through which the passage or slot 248 is formed. In this arrangement, during assembly, the lower part 236a is press fitted to the disc 24, the support ring 26 is positioned adjacent the flange 242, and then the upper part 236b is positioned to the opposite side of the support ring 26 and extending through the hole 32 thereof. Subsequently, the bolt 18 is threaded to the nut 238 located in the slot 248 and is fastened to securely clamp the two parts of the bush 236 and the disc 24 to the fingers 16 of the first shaft 12. As the two parts of this two part design of bush 236 can be assembled to the support ring 26 from the opposite sides thereof, there is no need for the opening or hole 32 of the support ring 26 to be shaped to permit the flange 240 to pass therethrough. As a result, a simple circular opening or hole 32 may be used instead of an elliptical or other non-circular shape. Furthermore, the step of adjusting the angle of the bush 236 to prevent withdrawal of the bush 236 from the opening 32 can be omitted, thereby simplifying the assembly process.

Whilst several specific embodiments of the invention have been described hereinbefore, it will be appreciated that a number of modifications and alterations may be made thereto without departing from the scope of the invention as defined by the appended claims.

What is claimed is:

1. A flexible coupling comprising:
   a flexible torque disc having a first plurality of fixing points whereby it can be mounted upon a first rotatable component, in use, and a second plurality of fixing points whereby it can be mounted upon a second rotatable component, in use;
   a support ring, whereby the flexible torque disc is secured to the support ring; and
   bushes, the bushes restricting deflection of the flexible torque disc relative to the support ring;
   wherein each bush is attached to a respective first fixing point of the flexible torque disc;
   wherein the bush extends through an opening provided in the support ring;
   wherein the bush defines a stop engageable with the support ring to limit movement of the part of the flexible torque disc adjacent the bushes away from the support ring; and
   wherein each bush holds a nut captive thereto.

2. A coupling according to claim 1, wherein the second fixing points of the flexible torque disc, and support ring, are secured to the second rotatable component at locations remote from the bushes.

3. A coupling according to claim 1, wherein the flexible torque disc includes three equiangularly spaced first fixing points and three equiangularly spaced second fixing points, the second fixing points each being located midway between a respective pair of the first fixing points.

4. A coupling according to claim 1, wherein the stop is defined by a first flange formed on the bush.

5. A coupling according to claim 4, wherein each bush further includes a second flange spaced from the first flange by a distance greater than the thickness of the support ring, part of the support ring being located between the first and second flanges.

6. A coupling according to claim 1, wherein each bush is of two part form, holding the support ring captive between the parts thereof, in use.

7. A coupling according to claim 1, wherein each bush includes a diametrically extending passage in which the nut is fitted.

8. A coupling according to claim 1, wherein the bushes and the flexible torque disc are bolted to the first rotatable component.

* * * * *